(12) United States Patent
Careme (10) Patent No.: US 12,115,817 B2
(45) Date of Patent: Oct. 15, 2024

(54) TIRE COMPRISING A TREAD OPTIMIZED FOR GRIP ON WET GROUNDS IN THE WORN CONDITION

(71) Applicant: COMPAGNIE GENERALE DES ETABLISSEMENTS MICHELIN, Clermont-Ferrand (FR)

(72) Inventor: Christopher Careme, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 30 days.

(21) Appl. No.: 18/011,503

(22) PCT Filed: Jun. 24, 2021

(86) PCT No.: PCT/FR2021/051169
§ 371 (c)(1),
(2) Date: Dec. 19, 2022

(87) PCT Pub. No.: WO2021/260335
PCT Pub. Date: Dec. 30, 2021

(65) Prior Publication Data
US 2023/0278369 A1 Sep. 7, 2023

(30) Foreign Application Priority Data
Jun. 26, 2020 (FR) ...................................... 2006739

(51) Int. Cl.
*B60C 11/00* (2006.01)
(52) U.S. Cl.
CPC ........ *B60C 11/005* (2013.01); *B60C 11/0008* (2013.01); *B60C 2011/0025* (2013.01); *B60C 2011/0033* (2013.01)

(58) Field of Classification Search
CPC ...................... B60C 11/005; B60C 2011/0025
See application file for complete search history.

(56) References Cited

U.S. PATENT DOCUMENTS

| 2013/0048169 A1 | 2/2013 | Erceg et al. |
| 2014/0150944 A1 | 6/2014 | Yamashita |
| (Continued) | | |

FOREIGN PATENT DOCUMENTS

| DE | 197 31 525 | 7/1998 |
| EP | 2 163 403 | 9/2009 |
| (Continued) | | |

OTHER PUBLICATIONS

Machine translation for Japan 04-218405 (Year: 2024).*
Machine translation for Europe 2,108,525 (Year: 2024).*

*Primary Examiner* — Steven D Maki
(74) *Attorney, Agent, or Firm* — Cozen O'Connor (57) ABSTRACT

A tire with improved performance in terms of grip on wet ground even when it is close to the legal wear limit. The tread comprises three layers of materials (M1, M2, M3), radially superposed: the layer (M1) is laid radially on the outside of the crown reinforcement. The layer (M2) is laid radially on the outside of the layer (M1), and the last layer (M3) intended to be in contact with the ground is laid radially on the outside of the layer (M2). The moduli of shear stiffness, G'M1), G'(M2), G'(M3), and the viscoelastic losses Tgδ(M1), Tgδ(M2), Tgδ (M3) of the materials of the layers satisfy the following relationships:
G'(M1)/G'(M2) is within the range [7; 25];
Tgδ (M2) and Tgδ (M3) are linked by the following relationship: (Tgδ (M2)−Tgδ (M3))/Tgδ (M2)≥30%
Thickness of layer (M3)/Thickness of layer (M2) is within the range [3; 10].

11 Claims, 2 Drawing Sheets

(56) References Cited

U.S. PATENT DOCUMENTS

2015/0107735 A1    4/2015  Djelloul-Mazouz et al.
2019/0255887 A1*   8/2019  Perrin ................. B60C 11/0066
2021/0031565 A1*   2/2021  Prost .................. B60C 11/0058

FOREIGN PATENT DOCUMENTS

| EP | 2108525 A1 * | 10/2009 | ........... B60C 1/0016 |
|----|---|---|---|
| EP | 2 565 056 | 3/2013 | |
| EP | 2 865 543 | 4/2015 | |
| EP | 3 508 354 | 7/2019 | |
| FR | 3 059 421 | 11/2016 | |
| JP | 04-218405 A * | 8/1992 | ........... B60C 11/005 |
| WO | WO 2004/096583 | 11/2004 | |
| WO | WO-2019/145621 A1 * | 8/2019 | |

* cited by examiner

TIRE COMPRISING A TREAD OPTIMIZED FOR GRIP ON WET GROUNDS IN THE WORN CONDITION

RELATED APPLICATIONS

This is a U.S. National Phase Application under 35 USC 371 of International Application PCT/FR2021/051169 filed on Jun. 24, 2021.

This application claims the priority of French application no. FR 2006739 filed Jun. 26, 2020, the entire content of all of which is hereby incorporated by reference.

FIELD OF THE INVENTION

Technical Field

The present invention relates to a tire for a motor vehicle with improved performance in terms of longitudinal grip on wet ground, in the worn state. The invention is more particularly suited to a radial tire intended to be fitted to a passenger vehicle or van.

DEFINITIONS AND BACKGROUND OF THE INVENTION

What is meant by a worn tire is tires which have had a normal service life until nearing the legal limit of wear indicators positioned on the sidewalls of the tires.

The legislation in question here relates to the UNECE (United Nations Economic Commission for Europe) Regulations R30 and R54 for tire safety. This organisation is comprised of most European countries, in particular those of the European Union, but also countries outside Europe, such as Japan, Thailand or Australia. These countries have validated an agreement on mutual recognition for the regulatory approval of tires. In other words, a tire that has regulatory approval in one of the UNECE countries is also valid in all the other countries of the organisation in which these regulations are in force.

Before it is sold at all in the UNECE countries, a tire for a passenger vehicle or a van must conform to regulatory safety requirements according to Regulations R30 and R54, and to the performance threshold requirements according to Regulation R117. The wear indicators in the furrows or in the transverse notches of the tread, and their distribution over the sidewalls of the tires, are requirements of these regulations. Regulation R117 on the performance thresholds requires that the tires perform to a level greater than thresholds established by the regulation as concerns rolling resistance, grip on wet and snowy ground, and running noise.

By way of illustration, a passenger car tire, in order to be sold in the UNECE countries, must have a rolling resistance less than or equal to 6 kg/t, as required by Regulation R117. This same tire needs to have a braking performance on wet ground greater than at least 10% over a control tire established by Regulation R117. The methods and parameters of these tests are also defined in this regulation.

The Regulation R117 on performance thresholds applies to new tires for their sale on the UNECE market, but the question arises of the effectiveness of these requirements depending on the wear of the tires.

The invention in this case relates to the durability of the grip performance on wet ground, that is to say the ability of the tire to still conform to the regulatory thresholds even for a tire close to the legal wear limit, using an appropriate test method.

By convention, in a frame of reference (O, XX', YY', ZZ'), the centre O of which coincides with the centre of the tire, the circumferential direction XX', axial direction YY' and radial direction ZZ' refer to a direction tangential to the tread surface of the tire in the direction of rotation, to a direction parallel to the axis of rotation of the tire, and to a direction orthogonal to the axis of rotation of the tire, respectively.

Radially inner and radially outer mean closer to and further away from the axis of rotation of the tire, respectively.

Axially inner and axially outer mean closer to and further away from the equatorial plane of the tire, respectively, the equatorial plane of the tire being the plane that passes through the middle of the tread of the tire and is perpendicular to the axis of rotation of the tire.

A tire comprises a crown intended to come into contact with the ground via a tread, the two axial ends of which are connected via two sidewalls to two beads that provide the mechanical connection between the tire and the rim on which it is intended to be mounted.

Generally, those skilled in the art define the tread of a tire mainly with the aid of the following design features: the tread surface, which makes it possible to define the total width of the tread, and the tread pattern, which is characterized by a volumetric void ratio.

The "tread surface" of the tread means the surface that groups together all the points of the tire that will come into contact with the ground under normal running conditions. These points that will come into contact with the ground belong to the contact faces of the blocks. For a tire, the "normal running conditions" are the use conditions defined by the ETRTO (European Tire and Rim Technical Organisation) standard. These use conditions specify the reference inflation pressure corresponding to the load-bearing capacity of the tire as indicated by its load index and its speed rating. These use conditions can also be referred to as "nominal conditions" or "working conditions".

The total width of the tread is the axial distance between the axial ends of the tread surface, these being symmetric with respect to the equatorial plane of the tire. From a practical standpoint, an axial end of the tread surface does not necessarily correspond to a point that is clearly defined. In the knowledge that the tread is delimited externally, on the one hand, by the tread surface and, on the other hand, by two surfaces where it meets two sidewalls that connect said tread to two beads intended to provide the connection to a mounting rim, an axial end can therefore be defined mathematically as being the orthogonal projection, onto the tread, of a theoretical point of intersection between the tangent to the tread surface in the axial end zone of the tread surface and the tangent to the connecting surface in the radially outer end zone of the connecting surface. The total width of the tread corresponds substantially to the axial width of the contact surface when the tire is subjected to the recommended load and pressure conditions.

An elastomeric compound is understood to be an elastomeric material obtained by blending its various constituents. An elastomeric compound conventionally comprises an elastomer matrix comprising at least one diene elastomer of the natural or synthetic rubber type, at least one reinforcing filler of the carbon black type and/or of the silica type, a crosslinking system that is usually sulphur-based, and protective agents.

The expression "composition based on" should be understood as meaning a composition including the compound and/or the reaction product of the various constituents used, some of these base constituents being capable of reacting or intended to react with one another, at least in part, during the various phases of manufacture of the composition, in particular in the course of crosslinking or vulcanizing it.

The expression "proportion by weight per hundred parts by weight of elastomer" (or phr) should be understood as meaning, within the meaning of the present invention, the proportion by weight per hundred parts of elastomer present in the compound composition under consideration.

The choice of the material of which the tread is made is a step that is essential to the design of a tire. In general, it is an elastomer compound characterized by its dynamic properties, such as its viscoelastic loss Tgδ (tangent delta) and/or its complex dynamic shear modulus G*.

The viscoelastic loss Tgδ and the complex shear modulus G* are generally determined during the measurement of the dynamic properties of the elastomeric compound, on a viscosity analyser (Metravib VA4000), according to the standard ASTM D 5992-96. The dynamic properties are measured on a sample of vulcanized elastomeric compound, that is to say elastomeric compound that has been cured to a degree of conversion of at least 90%, the sample having the form of a cylindrical test specimen having a thickness equal to 2 mm and a cross-sectional area equal to 78.5 mm². The response of the sample of elastomeric compound to a simple alternating sinusoidal shear stress, having a peak-to-peak amplitude equal to 0.7 MPa and a frequency equal to 10 Hz, is recorded. A temperature sweep is carried out at a constant rate of rise in temperature of +1.5° C./min. The results utilized are generally the complex dynamic shear modulus G*, comprising an elastic part G' and a viscous part G", and the dynamic loss Tgδ, equal to the ratio G"/G'. The glass transition temperature Tg is the temperature at which the dynamic loss Tgδ reaches a maximum during the temperature sweep. The value of G* measured at 23° C. is indicative of the stiffness of the rubbery material, that is to say of its resistance to elastic deformation.

As is known, the tread of a tire is provided with a tread pattern comprising, notably, tread pattern elements or elementary blocks delimited by various main, longitudinal, transverse or oblique grooves, the elementary blocks being able to have various finer sipes or sipe blades. The grooves form channels for draining off water when running on wet ground and define the edges of the tread pattern elements.

As a tire becomes worn, the volume of the tread decreases due to the loss of material associated with frictional contact with the road surface. When the tire is new, the tread has its maximum thickness. As the tire becomes worn, the height of the elementary blocks of the tread pattern decreases and the stiffness of these blocks increases. The increase in stiffness of the tread pattern elementary blocks causes a decrease in some performance aspects of the tire, such as grip on wet ground, even when the height of the tread pattern blocks is at the legal wear indicator.

It is therefore necessary not to confine tire tests to new tires but also to test their performance when worn, notably on wet ground.

By way of example, patent EP2163403B1 proposes a tread comprising two layers of material superposed radially and laid on the outside of the crown of a tire. The interface between the two layers composing the tread is wavy. The tread pattern changes depending on the wear of the tire so as to allow other cuts to appear.

International application WO2004/096583A1 discloses a tire with a multilayer tread and the process for manufacturing it. The tread comprises a first, internal layer, radially on the inside of an external layer intended to be in contact with the ground. On the one hand, the modulus of elasticity under extension-compression of the internal layer is greater than that of the external layer, and, on the other hand, the radially inner layer of the tread has a profile with radially oriented protuberances outwardly distributed over the entire width of the tread. This disclosure explains that such a tire mounted on a vehicle improves the behaviour of the vehicle, notably when cornering.

Tire life varies depending on the conditions in which the tires are used. However, even under harsh conditions of use, that is to say when driving with the vehicle subjected to high lateral acceleration, this life is often in excess of 10 000 km.

In order to limit the costs associated with obtaining a worn tire, it is standard practice to plane down the tread, that is to say to use cutting or brushing to reduce the thickness of the tread of the tire by a height corresponding to that which would be obtained as a result of tire wear during running. To that end, patent FR3059421 discloses a planing-down method for preparing worn tires for tests.

The inventors set themselves the aim of producing a tire which keeps good grip performance on wet ground throughout its life without adversely affecting the other performance aspects, such as rolling resistance, as a result.

SUMMARY OF THE INVENTION

An aim of the invention is a tire having a crown reinforcement, an underlayer, and a multilayer tread formed by three layers of elastomeric compounds M1, M2, M3, the layer M3 of which is intended to come into contact with the ground via a tread surface:
- the crown reinforcement being disposed radially on the inside of the multilayer tread;
- the underlayer being disposed radially on the outside of the crown reinforcement and radially on the inside of the multilayer tread, and extending over the entire axial width of the crown reinforcement;
- the multilayer tread comprising a first layer M1 disposed radially on the outside of the underlayer and extending axially over all or part of the axial width of the underlayer, at least in portions;
- the tread also comprising a radially outermost layer M3 provided with a tread surface;
- the elastomeric compounds of the layers M1, M2, M3 having a modulus of shear stiffness G'(M1), G'(M2), G'(M3), respectively, and having a viscoelastic loss Tgδ(M1), Tgδ(M2), Tgδ(M3), respectively, measured at 23° C. at 10 Hz and under an alternating shear stress of 10% of the material of each layer;
- the multilayer tread has an intermediate layer M2 disposed radially on the outside of the first layer M1 in contact with it, and radially on the inside in contact with the layer M3, extending axially along the layer M1 at least in portions;
- the ratio G'(M1)/G'(M2) is within the range [7; 25];
- the viscoelastic loss Tgδ(M2) of the elastomeric compound of the intermediate layer M2, and the viscoelastic loss Tgδ(M3) of the elastomeric compound of the radially outermost layer M3, are linked by the following relationship: (Tgδ(M2)−Tgδ(M3))/Tgδ(M2)≥30%
- the ratio of the radial thickness of the radially outermost layer M3 divided by the radial thickness of the intermediate layer M2, Thickness (M3)/Thickness (M2), is within the range [3; 10], said thicknesses being measured along the axis of symmetry of a meridian plane of the tire.

The principle of the invention is to improve grip on wet ground in exchange for a rise in rolling resistance within controlled limits, since the tire of the invention must conform to the regulation on performance thresholds, including in terms of rolling resistance. To that end, the addition of the layer of compound M2, which is optimized in terms of grip, instead of a part of the volume of the layer M3, which is optimized in terms of rolling resistance, results in a new balance in terms of performance. After the tread layer M3 becomes worn, the tire still has considerable grip potential on wet ground with the layer M2. In fact, the tire of the invention, throughout its service life, potentially retains grip performance on wet ground that conforms to regulations.

According to an embodiment of the invention, the multilayer tread has an intermediate layer M2 disposed radially on the outside of the first layer M1 in contact with it, and radially on the inside in contact with the layer M3, extending axially along the layer M1 at least in portions.

The layer of compound M2 is optimized in terms of grip on wet ground with a viscoelastic dissipation which is relatively great compared to that of the compound of the layer M3. By way of illustration, if the viscoelastic loss of the compound of the layer M2 is 0.25, then the layer M3 will have a viscoelastic loss of about 0.17. The layer M2 is flexible in the sense that its shear stiffness is relatively low in relation to the stiffnesses of the adjacent materials. The high hysteresis combined with the low stiffness of the compound of the layer M2 work towards improving grip on wet ground.

By way of example, the modulus of shear stiffness of the compound of the layer M1 could be about 25 MPa, and that of the compound of the layer M2 about 1.7 MPa. With such values, the compound of the layer M1 is referred to as stiff in relation to that of the layer M2.

The phenomenon of grip of the tire on wet ground takes place in three steps. The first step consists in drying the ground by discharging water by virtue of the tread pattern of the tread, and then a phase of contact with the ground via grip, and indentation. It is specifically in the indentation phase that the irregularities of the ground snag on the layer of compound and thus oppose the movement. The greater the hysteresis of the compound, the more the opposition to the movement is enhanced.

To obtain the performance compromise that is targeted, according to the invention, the stiffnesses and the hysteresis of the layers of compounds of the tread M1, M2 and M3 satisfy the following the relationships:

a. the ratio G'(M1)/G'(M2) is within the range [7; 25];
b. the viscoelastic loss Tgδ(M2) of the elastomeric compound of the intermediate layer M2, and the viscoelastic loss Tgδ (M3) of the elastomeric compound of the radially outermost layer M3, are linked by the following relationship: (Tgδ (M2)−Tgδ (M3))/Tgδ (M2) ≥30%.

The first relationship (a) means that the layer of compound M1 must be very stiff in relation to the layer M2. The layer M1 is never in contact with the ground; for the one part, it contributes to stiffening the tread, which is useful for generating sufficient drift thrust, and for the other part, because of its great stiffness, during manufacture it is the support for laying the layer M2, which is relatively "soft". Laying the layer M2 under these conditions makes it possible for its radially outer contour to be parallel to the axial profile of the mould. The axial profile of the mould is defined so as to obtain a uniform distribution of vertical pressures in the contact surface area. The uniformity of the contact pressures is necessary to obtain even wear of the tread in the axial direction. The layer M2, after the layer M3 has worn, is intended to be in contact with the ground, and its radially outer profile parallel to the axial profile of the mould thus ensures that even wear is obtained. Furthermore, penetration between the layers is limited with the stiff layer M1 as laying support.

According to the invention, the ratio G'(M1)/G'(M2) is within the range [7; 25]; this means that the shear stiffness of the layer M1 is at least seven times greater than that of the layer M2 in order to start to perceive the effects of the invention. However, from a ratio of shear stiffness G'(M1)/G'(M2) greater than 25, the effect declines asymptotically.

As regards the second relationship (b) on viscoelastic loss, this indicates the difference in hysteresis necessary to perceive the improvement in grip potential of the compound of the layer M2, which is intended to come into contact with the ground, in relation to the layer M3.

With the link between the stiffnesses and hysteresis of the tread layers M1, M2 and M3 being established, it is now a case of establishing the geometric relationships between these layers. Still according to the invention, the ratio of the radial thickness of the radially outermost layer M3 divided by the radial thickness of the intermediate layer M2, Thickness (M3)/Thickness (M2), is within the range [3; 10], said thicknesses being measured along the axis of symmetry of a meridian plane of the tire.

Taking into account the symmetry of revolution of the tire about its axis of rotation, the volume of a layer is directly proportional to its radial thickness in a meridian plane. The distribution of the volumes of the tread layers M1, M2 and M3 is the second lever to combine with the mechanical and hysteresis properties of the layers to arrive at the invention. The tread layer M3, which is optimized in terms of hysteresis, has the largest volume. The invention works if the layer M2 has a volume greater than or equal to one tenth of the volume of the layer M3, and less than or equal to one third of this volume.

If the volume of the layer M2 is less than one tenth of the volume of the layer M3, the improvement in terms of grip on wet ground is not significant in this case. Conversely, if the layer M2 has a volume greater than one third of the volume of the layer M3, the deterioration in the rolling resistance becomes prohibitive.

The combination of the essential features of the invention, which were described above, make it possible to produce a tire with a multilayer tread that enables the grip performance on wet ground to be made more durable. In other words, by virtue of the invention, the grip performance on wet ground does not deteriorate when the tire becomes worn. It will now be possible to examine the other features and the embodiments of the invention.

Advantageously, the ratio of the modulus of shear stiffness of the elastomeric compound of the first layer M1, divided by the modulus of shear stiffness of the elastomeric compound of the radially outermost layer M3, G'(M1)/G'(M3) is within the range [7; 25]. The layer M3 of the tread is intended to be in contact with the ground when the tire is new and has the largest volume of the three layers. The performance compromise makes the case for a layer M3 with low hysteresis and shear stiffness of the same order of magnitude as for the second layer M2.

With preference, the ratio G'(M1)/G'(M3) is within the range [6; 22]; similarly, the ratio G'(M1)/G'(M2) is within the range [6; 22]. The difference in mechanical properties between the layers M2 and M3 mainly relates to the hysteresis, but in stiffness terms, the shear moduli have the same order of magnitude in comparison with the compound of the layer M1.

With further preference, the modulus of shear stiffness of the elastomeric compound of the underlayer is less than or equal to 1.5 MPa. The multilayer tread is connected to an underlayer referred to as "soft", in relation to the shear stiffness of the elastomeric compound of the first layer M1.

Advantageously, the viscoelastic loss Tgδ (M2) of the elastomeric compound of the intermediate layer M2 is greater than or equal to 0.2, and even more advantageously, the viscoelastic loss Tgδ (M2) of the elastomeric compound of the intermediate layer M2, and the viscoelastic loss Tgδ(M3) of the elastomeric compound of the radially outermost layer M3, are linked by the following relationship: (Tgδ(M2)−Tgδ(M3))/Tgδ(M2)≥20%. The relative difference between the viscoelastic losses of the elastomeric compounds of the layers M2 and M3 are in a ratio greater than 20%. In other words, a relative difference of at least 20% between the viscoelastic losses of the elastomeric compounds of the two layers is necessary in order to start to perceive the effects of the invention.

With preference, the modulus of shear stiffness G'(M1) of the elastomeric compound of the first layer M1 is greater than 7 MPa, and even more preferably, the modulus of shear stiffness G'(M1) of the elastomeric compound of the first layer M1 is greater than or equal to 12 MPa.

For the invention to work properly, the stiffnesses of the tread layers are correlated. The first layer M1 has the greatest stiffness, with a value of at least 7 MPa, and preferably greater than or equal to 12 MPa.

Advantageously, the planed-down profile of the tread being by convention, defined such that the tread pattern height remaining after planing-down is 2 mm over the entire axial width of the tread, the maximum difference Emax being the radial distance between the planed-down profile of the tread, and the radially outer profile of the first layer M1, characterized in that the maximum difference Emax is constant, ±5 mm, over at least a central portion of the tread.

In a first embodiment, with the furrows of the tread being the deepest grooves of the tread pattern, the material appearing at the bottom of the furrows is the same material as the material of which the radially outermost layer M3 of the tread is made.

In a second embodiment, the intermediate layer M2, which is disposed radially on the outside of the first layer M1 and is in contact with the layer M3 radially on the inside, extends axially continuously along the layer M1.

In a third embodiment, with the tread having tread pattern blocks that are separated by furrows oriented substantially circumferentially, the first layer M1, axially next to some tread pattern blocks, is extended radially outwards by at least one reinforcing element extending radially from the radially outer surface of the layer M1 towards the outside of the tread to a radial height greater than 75% of the radial thickness of the tread, said reinforcing element having a variable axial width, from a maximum value less than 50% of the axial width of said tread pattern block, said axial width decreasing radially upwardly.

BRIEF DESCRIPTION OF THE DRAWINGS

The present invention will be understood better from reading the detailed description of embodiments considered by way of entirely non-limiting examples and illustrated by the appended drawings, in which.

DETAILED DESCRIPTION OF THE DRAWINGS

Figure 1:
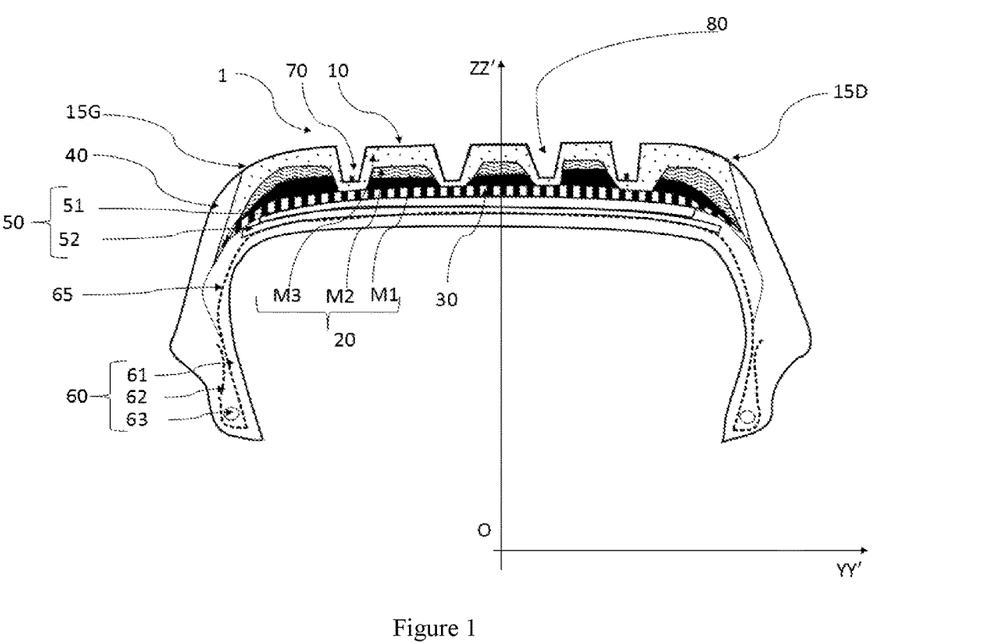
FIG. 1 shows a schematic meridian section through a tire in accordance with a first embodiment of the invention.

FIG. 1 shows a tire with the overall reference 1, having a crown reinforcement 50 radially on the inside of a carcass reinforcement 60, an underlayer 30, and a multilayer tread formed by layers M1, M2, M3, the layer M3 of which is intended to come into contact with the ground via a tread surface 10:

The radially innermost carcass reinforcement 60 comprises at least one carcass layer, shown in FIG. 1 in dashed lines. The carcass layer is formed by reinforcers that are coated in an elastomeric compound. The carcass layer 60 comprises a main part 61 that joins the two beads 65 together and is wound, in each bead, from the inside of the tire to the outside, around a usually metal circumferential reinforcing element referred to as a bead wire 63, so as to form a turn-up 62. The metal reinforcers of a carcass layer are substantially mutually parallel and form an angle of between 85° and 95° with the circumferential direction.

the crown reinforcement 50 is disposed radially on the outside of the carcass reinforcement 60 and radially on the inside of the multilayer tread 20, and is formed notably by two crown layers (51, 52) constituted by metal reinforcers coated in an elastomeric compound.

the underlayer 30 is disposed radially on the outside of the crown reinforcement 50 and radially on the inside of the multilayer tread 20, and extends over the entire axial width of the crown reinforcement 50. The underlayer 30 is shown in FIG. 1 by a pattern formed by vertical hatching in white and black.

More specifically, the three layers of compounds M1, M2 and M3 of the tread 20 are radially superposed on the underlayer 30 and oriented radially outwards. The first layer of elastomeric compound M1 is shown in FIG. 1 by a black background, and is laid radially innermost on the underlayer 30. The second layer M2 is laid radially on the outside of the first layer M1. In FIG. 1, the layer M2 is shown by a pattern in the form of small waves. Lastly, the third layer M3 laid radially on the outside of the layer M2 is shown by a pattern having a clear background with black dots. This layer M3 comprises the tread surface 10 and is intended to be in contact with the ground when the tire is new.

In the embodiment of FIG. 1, the tread 20 also comprises furrows 80 which are oriented mainly circumferentially and determine the successive tread pattern blocks in the axial direction from the shoulder 15G to the shoulder 15D. Each furrow 80 is delimited radially towards the inside by a furrow bottom. The layer M3 extends continuously over the entire axial width of the tread, passing through the bottom of the furrows, whereas the layers M2 and M1 are discontinuous. In some groove bottoms there is an indicator 70 of the state of wear of the tread. This indicator extends radially outwards from the groove bottom over a height of 1.6 mm.

Figure 2:
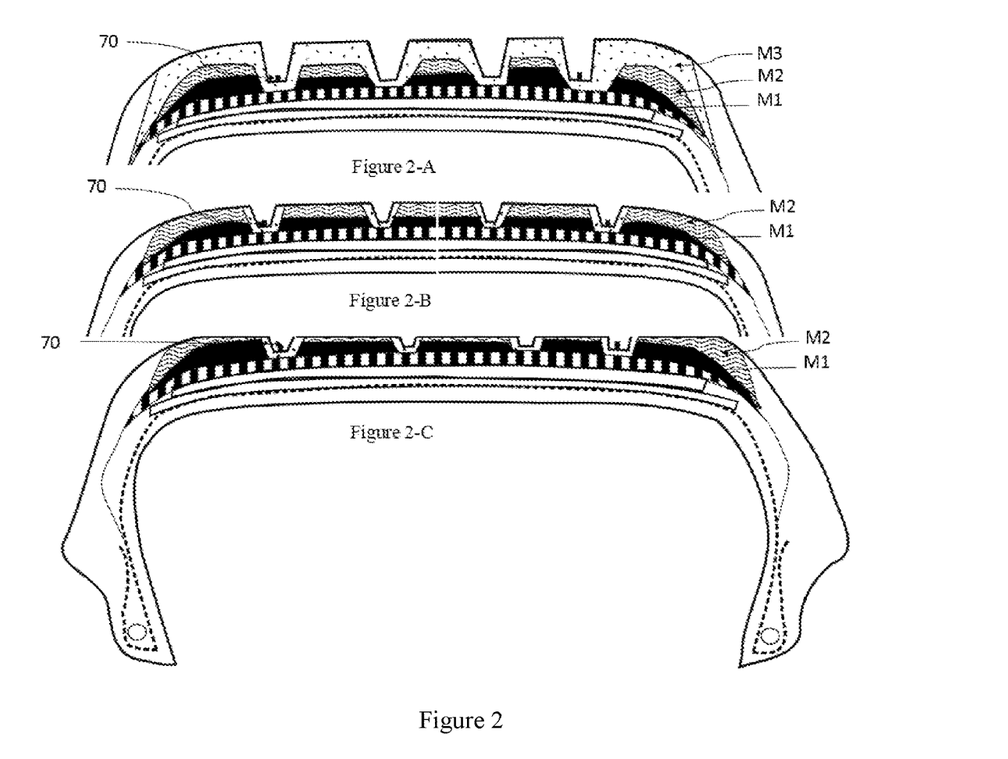
FIG. 2 shows, in a meridian section, the kinetics of wear of the tire, wherein FIGS. 2-A, 2-B, 2-C show different states of wear of the tire, according to the first embodiment of the invention.

FIG. 2 shows successive states of wear of the tire, 2-A, 2-B and 2-C. FIG. 2-A shows the new tire with the tread made up of three layers of elastomeric compound M1, M2, M3. In FIG. 2-B, the layer M3 is entirely worn, and the layer M2 comes into contact with the ground directly. The tire still has potential for use, since the wear indicators 70 have a radial height less than that of the layer M2. In FIG. 2-C, the tire is worn. The height of the tread is at the level of the wear indicator 70.

Figure 3:
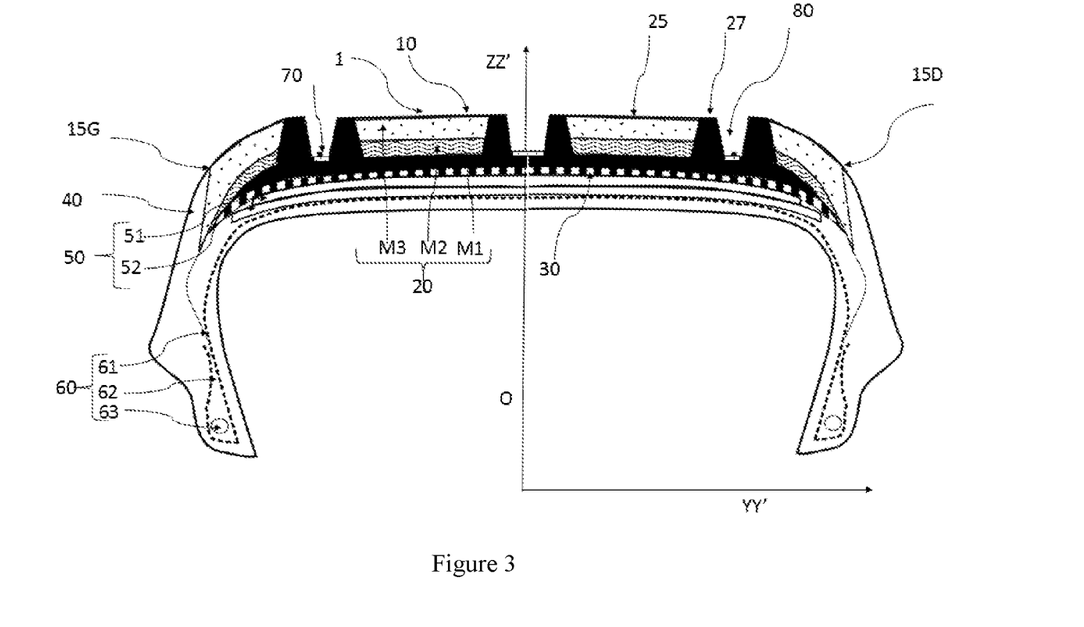
FIG. 3 shows a schematic meridian section through a tire in accordance with a second embodiment of the invention.

FIG. 3 shows a diagram of a tire of a second embodiment of the invention in a meridian plane, wherein the first layer M1 of the tread continues radially outwards in the shape of a trapezium 27 on the tread surface 10 so as to axially border the furrows 80 on either side. Passing through the tread from the end 15G to the end 15D, each tread pattern block delimited by the furrows 80 is bordered by continuations of the layer M1 in the shape of a trapezium 27 on either side. The blocks located at the ends 15G and 15D are bordered only on the side facing the centre of the tread.

Figure 4:
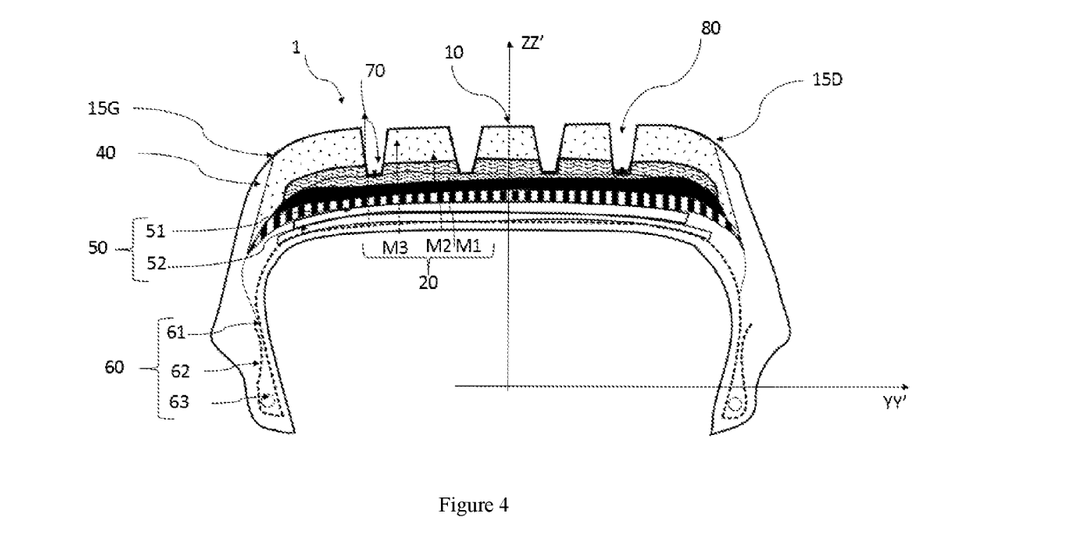
FIG. 4 shows a schematic meridian section through a tire in accordance with a third embodiment of the invention.

FIG. 4 shows the third embodiment of the invention, which is characterized by the use of three layers M1, M2 and M3 which are continuous over the entire width of the crown.

In other embodiments, which are not shown here, the tire may contain a hooping reinforcement comprising one or two hooping layers, radially outwardly superposed on the crown reinforcement 50. Each hooping layer is formed by mutually parallel reinforcers, with the formation of angles at most equal to 2.5° with the circumferential direction.

Tests

Embodiments of the invention were studied more particularly in the case of a passenger vehicle tire of standardized designation, according to the ETRTO (European Tire and Rim Technical Organisation), 245/45 R18 100W. For this size, a version in accordance with the first embodiment of the invention was produced, compared to a conventional tire of the prior art with a single-layer tread.

The layers M1, M2 and M3 of the tread are characterized by their dynamic and geometric properties, which are grouped together in the following table:

TABLE 1

|  | Radial thickness (mm) | G' in MPa | Tgδ | Volume in cm3 |
| --- | --- | --- | --- | --- |
| Underlayer | 1.6 | 0.2 | 0.00 | 785 |
| Compound of layer M1 | 1.3 | 25 | 0.27 | 342 |
| Compound of layer M2 | 1.3 | 1.7 | 0.25 | 330 |
| Compound of layer M3 | 4.5 | 1.4 | 0.17 | 1331 |

The underlayer laid radially on the outside of the crown reinforcement has a radial thickness of 1.6 mm, measured along the axis of symmetry of a meridian plane of the tire. This thickness corresponds to a wheel revolution volume of 785 cm3.

An example of a suitable composition for the underlayer is given in the following table:

TABLE 2

| Underlayer | |
| --- | --- |
| Component | Phr |
| NR$^{(a)}$ | 100 |
| Carbon black | 4 |
| 6-PPD$^{(b)}$ | 2.2 |
| DPG$^{(c)}$ | 2.1 |
| ZnO$^{(d)}$ | 1.5 |
| Stearic acid | 3 |
| Resin | 29.3 |
| HTO$^{(e)}$ | 38 |
| CBS$^{(f)}$ | 1.4 |
| Sulfur | 1.6 | where:
a. NR: Natural rubber
b. 6-PPD: N-(1,3-Dimethylbutyl)-N'-phenyl-para-phenylenediamine (Santoflex 6-PPD from Flexsys)—antioxidant
c. DPG: Diphenylguanidine (Perkacit DPG from Flexsys)—vulcanization activator
d. ZnO: Zinc oxide, vulcanization
e. HTO: Sunflower oil comprising 85% by weight of oleic acid, Lubrirob Tod 1880 from Novance—plasticizer
f CBS: N-cyclohexyl-2-benzothiazole sulphenamide ("Santocure CBS" from Flexsys)—vulcanization accelerator With such a composition, the underlayer has a modulus of shear stiffness of 0.45 MPa, and a viscoelastic loss of 0.06. The underlayer is optimized in terms of hysteresis in order to contribute to reaching the target performance in rolling resistance.

The first layer M1 of the tread laid radially on the outside of the underlayer has a thickness of 1.3 mm, measured along the axis of symmetry of a meridian plane of the tire, this representing a volume of 342 cm3.

An example of a composition for the layer M1 is in the following table:

TABLE 3

| Layer M1 | |
| --- | --- |
| Component | Phr |
| NR$^{(a)}$ | 100 |
| Carbon black | 70 |
| Phenol-formaldehyde resin | 12 |
| 6-PPD$^{(b)}$ | 2.5 |
| Sulfur | 3 |
| ZnO$^{(c)}$ | 3 |
| Stearic acid | 2 |
| CBS$^{(d)}$ | 2 |
| HTMT$^{(e)}$ | 4 |
| Sulfur | 3 | where:
a. NR: Natural rubber
b. 6-PPD: N-(1,3-Dimethylbutyl)-N'-phenyl-para-phenylenediamine (Santoflex 6-PPD from Flexsys)—antioxidant
c. ZnO: Zinc oxide, vulcanization
d. CBS: N-cyclohexyl-2-benzothiazole sulphenamide ("Santocure CBS" from Flexsys)—vulcanization accelerator
e. HTMT: Resin The modulus of shear stiffness of the elastomeric compound of the layer M1 is 25 MPa, for a viscoelastic loss measured by a Tgδ value of 0.27.

The second layer M2 of the tread laid radially on the outside of the layer M1 has a radial thickness of 1.3 mm, measured along the axis of symmetry of a meridian plane. The volume of the layer M2 is 330 mm3. An example of a composition for this layer is as follows:

TABLE 4

| Layer M2 | |
| --- | --- |
| Component | Phr |
| SBR (a) | 100 |
| Silica (b) | 110 |
| Coupling agent (c) | 9 |

TABLE 4-continued

Layer M2

| Component | Phr |
| --- | --- |
| Liquid plasticizer (d) | 20 |
| Resin plasticizer (e) | 50 |
| Carbon Black | 5 |
| Zinc oxide | 3 |
| Stearic acid | 2 |
| Antioxidant (f) | 2 |
| Accelerator (g) | 2 |
| DPG | 2 |
| Sulfur | 1 | where:
- (a) SBR with 27% styrene, 1,2-butadiene: 5%, cis-1,4-butadiene: 15%, trans-1,4-butadiene: 80%; Tg=−48° C.
- (b) Zeosill 165MP silica from Solvay with BET surface area of 160 m2/g
- (c) 5169 TESPT silane from Evonik
- (d) Flexon 630 TDAE oil from Shell
- (e) Escorez 2173 resin from Exxon
- (f) Santoflex 6PPD antioxidant from Solutia
- (g) Santocure CBS accelerator from Solutia With such a composition, the modulus of shear stiffness is 1.7 MPa, and the viscoelastic loss has a Tgδ of 0.25.

The modulus of shear stiffness of the layer M1 is equal to approximately 15 times that of the layer M2, and the viscoelastic losses have the same order of magnitude. The layer M2 is intended to come into contact with the ground; a relatively flexible compound and high hysteresis are expected for good grip performance on wet ground.

Lastly, the layer M3 of the tread of the tire of the invention is laid radially on the outside of the layer M2 to a radial thickness of 4.5 mm, measured along the axis of symmetry of a meridian plane. Its wheel revolution volume is 131 cm3. Its modulus of shear stiffness is 1.4 MPa, and the viscoelastic loss Tgδ(M3) is 17%. An example of a composition for this layer is as follows:

TABLE 5

Layer M3

| Component | Phr |
| --- | --- |
| SBR (a) | 100 |
| Silica (b) | 70 |
| Coupling agent (c) | 6 |
| Liquid plasticizer (d) | 30 |
| Resin plasticizer (e) | 0 |
| Carbon black | 5 | where:
- (a) SBR with 27% styrene, 1,2-butadiene: 5%, cis-1,4-butadiene: 15%, trans-1,4-butadiene: 80%; Tg=−48° C.
- (b) Zeosill 165MP silica from Solvay with BET surface area of 160 m2/g
- (c) 5169 TESPT silane from Evonik
- (d) Flexon 630 TDAE oil from Shell
- (e) Escorez 2173 resin from Exxon It is possible to easily verify that the tire tested is in accordance with the main features of the invention:
- the ratio G'(M1)/G'(M2) is within the range [7; 25];
- the ratio of the thickness of the layer (M3) divided by the thickness of the layer (M2), Thickness (M3)/Thickness (M2), is within the interval [3; 10];
- the viscoelastic loss Tgδ (M2) of the material of the layer (M2), and the viscoelastic loss Tgδ (M3) of the material of the layer (M3), are linked by the following relationship: (Tgδ(M2)−Tgδ(M3))/Tgδ(M2)≥30%.

The tread with the three layers M1, M2 and M3 was obtained by a volumetric coextrusion process, which makes it possible to simultaneously extrude the three layers. Such a process is described in patent WO2018087467A1.

The inventors have observed an improvement in grip on wet ground at the end of life of the tire by 5%, countered by a loss in resistance of 0.06 kg/t. The wear of the control tire and the tire of the invention was simulated by planing down the tread of the test and control tires, as described in patent FR3059421A1.

The invention is not limited to the embodiments and variants presented and other embodiments and variants will become clearly apparent to a person skilled in the art.

The invention claimed is:

1. A tire having a crown reinforcement, an underlayer, and a multilayer tread formed by three layers of elastomeric compounds (M1, M2, M3), the layer (M3) of which is intended to come into contact with ground via a tread surface:
   - the crown reinforcement being disposed radially on the inside of the multilayer tread;
   - the underlayer being disposed radially on the outside of the crown reinforcement and radially on the inside of the multilayer tread, and extending over the entire axial width of the crown reinforcement;
   - the multilayer tread comprising a first layer (M1) disposed radially on the outside of the underlayer and extending axially over all or part of the axial width of the underlayer, at least in portions;
   - the tread also comprising a radially outermost layer (M3) provided with a tread surface;
   - the elastomeric compounds of the layers (M1, M2, M3) having a modulus of shear stiffness G'(M1), G'(M2), G'(M3), respectively, and having a viscoelastic loss Tgδ(M1), Tgδ(M2), Tgδ(M3), respectively, measured at 23° C. at 10 Hz and under an alternating shear stress of 10% of the material of each layer, wherein
   - the multilayer tread has an intermediate layer (M2) disposed radially on the outside of the first layer (M1) in contact with it, and radially on the inside in contact with the layer (M3), extending axially along the layer (M1) at least in portions,
   and
   - the ratio G'(M1)/G'(M2) is within the range 7 to 25;
   - the viscoelastic loss Tgδ(M2) of the elastomeric compound of the intermediate layer (M2), and the viscoelastic loss Tgδ(M3) of the elastomeric compound of the radially outermost layer (M3), are linked by the following relationship: (Tgδ(M2)−Tgδ(M3))/Tgδ(M2) ≥20%;
   - the ratio of the radial thickness of the radially outermost layer (M3) divided by the radial thickness of the intermediate layer (M2), thickness (M3)/thickness (M2), is within the range 3 to 10, said thicknesses being measured along the axis of symmetry of a meridian plane of the tire.

2. The tire according to claim 1, wherein the ratio of the modulus of shear stiffness of the elastomeric compound of the first layer (M1), divided by the modulus of shear stiffness of the elastomeric compound of the radially outermost layer (M3), G'(M1)/G'(M3) is within the range 7 to 25 [7; 25].

3. The tire according to claim 1, wherein the modulus of shear stiffness of the elastomeric compound of the underlayer is less than or equal to 1.5 MPa.

4. The tire according to claim 1, wherein the viscoelastic loss Tgδ(M2) of the elastomeric compound of the intermediate layer (M2) is greater than or equal to 0.2.

5. The tire according to claim 1 wherein the viscoelastic loss Tgδ(M2) of the elastomeric compound of the intermediate layer (M2), and the viscoelastic loss Tgδ(M3) of the elastomeric compound of the radially outermost layer M3, are linked by the following relationship: (Tgδ(M2)−Tgδ(M3))/Tgδ(M2)≥30%.

6. The tire according to claim 1, wherein the modulus of shear stiffness G'(M1) of the elastomeric compound of the first layer (M1) is greater than 7 MPa.

7. The tire according to claim 1, wherein the modulus of shear stiffness G'(M1) of the elastomeric compound of the first layer (M1) is greater than or equal to 12 MPa.

8. The tire according to claim 1, wherein the planed-down profile of the tread is by convention, defined such that the tread pattern height remaining after planing-down is 2 mm over the entire axial width of the tread, the maximum difference Emax being the radial distance between the planed-down profile of the tread, and the radially outer profile of the first layer (M1), and wherein the maximum difference Emax is constant, ±5 mm, over at least a central portion of the tread.

9. The tire according to claim 1, wherein furrows of the tread are deepest grooves of the tread, and wherein material appearing at a bottom of the furrows is a same material as the material of which the layer (M3) of the tread is made.

10. The tire according to claim 1, wherein the intermediate layer (M2), which is disposed radially on the outside of the first layer (M1) and is in contact with the layer (M3) radially on the inside, extends axially continuously along the layer (M1).

11. The tire according claim 1, wherein the tread has tread pattern blocks that are separated by furrows oriented substantially circumferentially, and wherein the first layer (M1), axially next to some tread pattern blocks, is extended radially outwards by at least one reinforcing element extending radially from the radially outer surface of the layer (M1) towards the outside of the tread to a radial height greater than 75% of the radial thickness of the tread, said reinforcing element having a variable axial width, from a maximum value less than 50% of the axial width of said tread pattern block, said axial width decreasing radially upwardly.

\* \* \* \* \*